T. E. STRAUS.
COTTON PICKER.
APPLICATION FILED DEC. 4, 1911.
1,067,282.
Patented July 15, 1913.
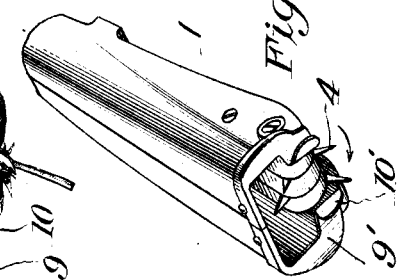
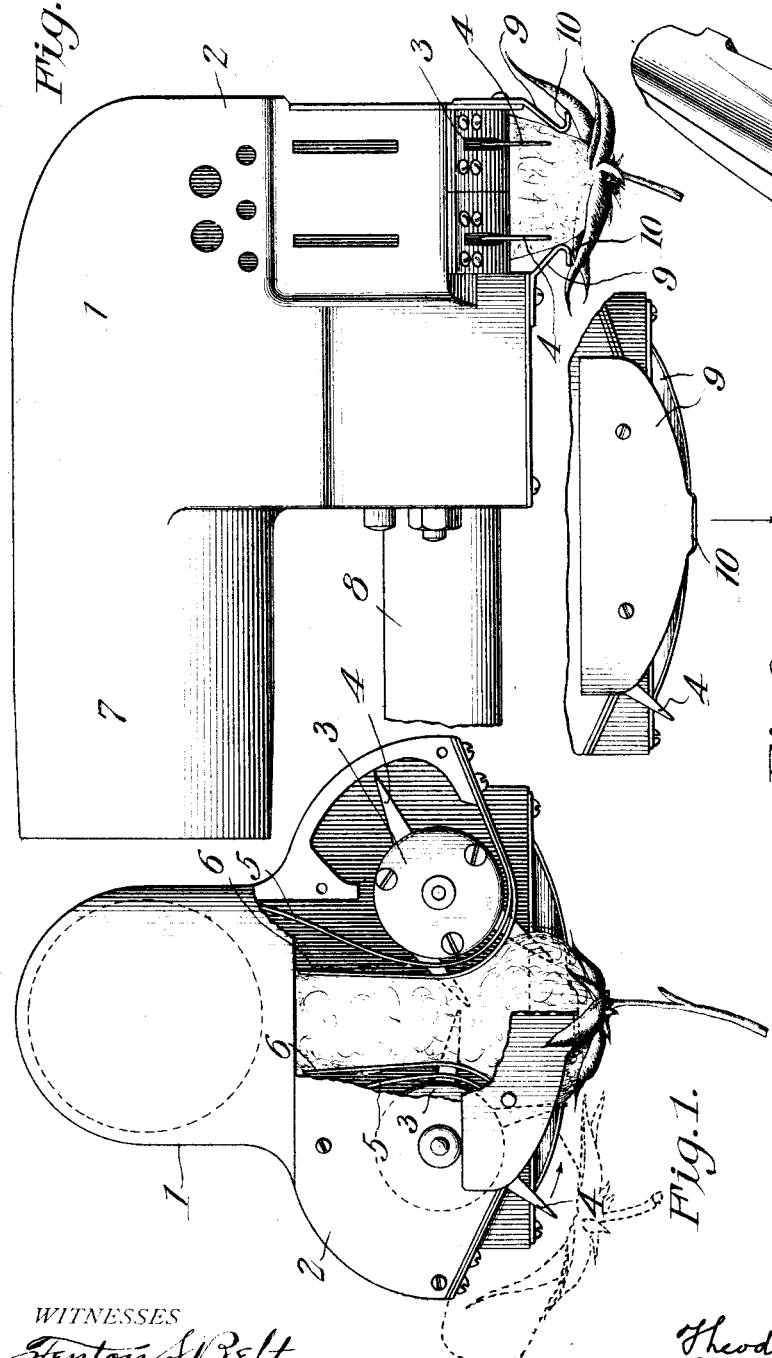
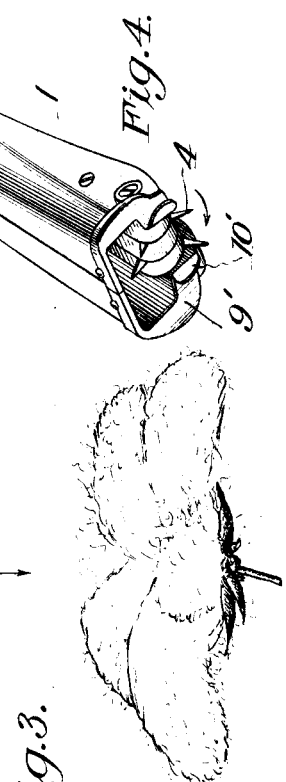
WITNESSES
Fenton S. Belt
Mary H. Farr.
INVENTOR
Theodore E. Straus
By Sturtevant & Mason
Attorneys

UNITED STATES PATENT OFFICE.

THEODORE E. STRAUS, OF BALTIMORE, MARYLAND, ASSIGNOR TO WORTHINGTON COTTON-HARVESTER COMPANY, OF BALTIMORE, MARYLAND, A CORPORATION OF DELAWARE.

COTTON-PICKER.

1,067,282. Specification of Letters Patent. Patented July 15, 1913.

Application filed December 4, 1911. Serial No. 663,747.

*To all whom it may concern:*

Be it known that I, THEODORE E. STRAUS, a citizen of the United States, residing at Baltimore, in the State of Maryland, have invented certain new and useful Improvements in Cotton-Pickers, of which the following is a description, reference being had to the accompanying drawing and to the figures of reference marked thereon.

My invention relates to improvements in cotton pickers in that class particularly in which a tool held in the hand of the operator is presented to the cotton on the plant, the nozzle containing rotating picker teeth which pick off the cotton from the husk or bur, the cotton being delivered by suction to a suitable receptacle. In this type of cotton picker, there is usually provided a hand tool to be manipulated by the operator, which has a head with a mouth or nozzle to be presented to the cotton plant. This mouth leads out of a suction pipe through which a current of air is drawn by a suitable fan or the like, thus sucking in the cotton which is picked off by picker teeth or fingers located in the mouth of the tool, and rotated by suitable gearing which is adapted to be operated by flexible shafting connected or disconnected at will. In the use of cotton pickers of this character, it has been found almost impossible in practice to prevent portions of the husk, leaves, stalk, and the like, from being sucked into the mouth of the nozzle, which is objectionable if they pass with the cotton through the suction pipe into the receptacle, rendering it unclean and non-merchantable, and is also objectionable by reason of the danger of clogging the action of the picker teeth and other mechanism.

The object of my invention, in addition to the separation of the cotton from the husk, is to provide means for engaging and guiding the husk portions, twigs, and the like, so that they cannot enter the mouth of the nozzle.

A further object of the invention is to provide a cotton picker with mechanical picking devices for engaging the cotton, with means for stripping the husks, burs and twigs from the mechanical picking devices, and independent means for stripping the cotton from said mechanical picking devices, whereby the cotton is carried in a substantially clean condition to the intake passage, where it is conveyed by such into the storage receptacle.

These and other objects will in part be obvious, and will in part be hereinafter more fully described.

The invention is illustrated in the accompanying drawings, in which,

Figure 1 is an end view, with parts of the wall removed, of a cotton-picking tool embodying my invention; Fig. 2 is a similar side view; Fig. 3 is a detail front view of a portion of Fig. 1, and showing a cotton boll; and Fig. 4 is a perspective view of a modified form of tool, showing my invention applied thereto.

In the drawings I have shown merely the cotton picker nozzle or hand tool 1, which is provided with a head or casing 2, which head, as clearly shown in Fig. 2 of the drawing, projects laterally from the suction tube 7, through which the cotton is conveyed to the storage receptacle. Mounted in the head or casing are two drums or supports 3, 3. These drums, as clearly shown in the drawings, are located within the intake mouth of the nozzle at each side of a central intake passage through which the cotton or cotton fiber is carried to the head 2. Each of these drums is provided with a plurality of sets of picker fingers 4, which are pivoted to the drum, and are controlled by a stationary cam, as is common in this type of pickers. These fingers extend from the support beyond the mouth and into the intake passage, so that the cotton fiber is engaged thereby and carried to said intake passage.

To strip the cotton fiber from the picker fingers or teeth, I have provided stripper plates 5 and 6, which are separated sufficiently to allow the teeth to pass beneath the plates and the cotton to be removed therefrom. The plates 6, 6, at each side of the picker head are substantially parallel, thus forming an intake passage for the cotton. These yielding stripper plates and the particular arrangement of the same relative to the intake passage and the picker drums, *per se*, form no part of the present invention, but the same are the invention of Bruce Worthington and myself, and are shown, described and claimed in an application Serial No. 663,745, filed December 4th, 1911.

The drums are rotated by suitable driving means, as is common in this type of picker.

The two sides of the face of the nozzle or head of the cotton picker are inclined outwardly toward the center of the nozzle, as clearly shown in Fig. 1. The drums 3, 3, for the picker fingers, are so positioned that the fingers extend beyond the inclined faces at points each side of the central plane of the nozzle.

In order to deflect the husks or burs and small twigs, and thus strip the same from the mechanical picker fingers, I have provided the head with side plates 9, each of which is bent inwardly over the central portion of the nozzle and is formed with a lip 10. These side plates contract the central opening of the nozzle, and also form inclined ledges which terminate in the shoulders at the lips 10. The husks, burs, leaves or small twigs engaged by the picker fingers will be carried against these inclined ledges of the plates 9, 9, and will be pushed along the same until the husks and twigs are moved out of the path of the picker fingers. These inwardly projecting plates with the ledges and lips thereon, form stripping devices for removing the husks, leaves and twigs from the picker fingers, and allow the cotton fiber (which will be referred to hereinafter as cotton,) alone to be carried by the picker fingers to the intake passage, where it is stripped from the mechanical picker fingers by the stripper plates 6. These plates 9—9, as above noted, are inclined outwardly toward the center of the nozzle. That is, the central plane extending transversely across the nozzle, and longitudinally of the intake passage. The edges or the outer faces of the plates formed by the edges extend, longitudinally of the axis of the intake passage, beyond the outermost limit of travel of the points of the picking devices, at points in front of the intake passage and also at points adjacent the intake passage on each picking side thereof. These inclined faces of the stripping plates 9—9 also, if projected, cross the path of travel of the points of the picking devices at points at opposite sides of the picking nozzle, and also at points where the active faces of the picking devices are substantially at right angles to a line tangent to the edges at said crossing point. By this particular construction of the stripper plates, the burs and twigs will be removed from the picker fingers at one side the intake passage, and before said burs or twigs are carried into range of the suction of said intake passage. Said burs and twigs will also be removed from the picking fingers when said active faces of the picking devices are so positioned that said burs and twigs may be readily released therefrom.

It will be noted that the active region of the picker fingers, therefore, is at one side of the central portion of the nozzle. In other words, if the central portion of the nozzle is presented to the cotton plant, there will be no picking action, but only as first one side and then the other of the nozzle is brought into contact with the plant will the cotton be engaged by the mechanical picking means, and these side plates will, therefore, effectually prevent the husks, burs, twigs and leaves from being carried into the nozzle by the mechanical picker fingers, which insures not only a clean picking of cotton, but also prevents the stopping of the suction passage by these hard objectionable parts. These functions are in part secured by the ledges being inclined outwardly toward the center of the nozzle, and in part secured by the inwardly projecting portions of the plate which contract the opening into the nozzle directly in front of the intake passage.

From the above description it will be apparent that I have provided a cotton picking nozzle which has a central intake passage and said nozzle has two picking faces, which are independent of each other, and disposed on opposite sides of the intake passage, which picking faces are also inclined relative to each other. The stripper plates, which extend longitudinally of the axis of the intake passage, beyond the path of movement of the picker fingers, and which are also bent inwardly over said intake passage, serve to divide the nozzle into two distinct separate picking regions, one on each side of the central intake passage. By this arrangement of nozzle, the operator may present first one face and then the other to the cotton plant by the simple turning of the nozzle about the longitudinal axis of the suction tube. If the first picker fails to strip the cotton entirely from the boll, the second picker passing thereby will pick up the remainder of the cotton.

In Fig. 4 I have shown a modification, in which the nozzle or mouth of the cotton picker is provided with a plate 9', having lips 10', and with a single drum carrying picker teeth located at one side of the intake passage. The plate 9' and the lips 10' serve to strip the husks and twigs from the mechanical picker fingers in the same manner as above described.

It is obvious that minor changes in the details of construction may be made, without departing from the spirit of the invention, as set forth in the appended claims.

Having thus particularly described my invention, what I claim as new and desire to secure by Letters Patent, is:—

1. A cotton picking device including in combination, a suction nozzle comprising a casing provided with an intake mouth and an intake passage leading therefrom, a movable support located in said mouth at one side of said intake passage and having picking fingers extending therefrom beyond the mouth and into the intake passage, stripping means for said picking fingers, said stripping means being secured to the casing and gradually extending outwardly therefrom in a direction longitudinally of the intake passage from a point adjacent the ends of the sides of the casing and within the outer limits of travel of the picker fingers to the middle portion of the nozzle beyond the outer limits of the travel of the fingers, whereby said stripping means acts to remove the burs from the fingers as the cotton is stripped therefrom and carried into said intake passage.

2. A cotton picking device including, in combination, a suction nozzle comprising a casing provided with an intake mouth and an intake passage leading therefrom, a movable support located in said mouth on two diametrically opposite sides of said intake passage and having fingers extending therefrom beyond the mouth and into said intake passage, stripping means secured to said casing and extending outwardly therefrom in a direction longitudinally of the intake passage from a point adjacent the ends at each side and within the outer limits of the travel of the picker fingers to the middle portion thereof beyond the outer limits of travel of the pickers, whereby the stripping means acts to remove the burs from said picking fingers as the cotton is stripped therefrom and carried into the intake passage.

3. A cotton picking device including in combination, a suction nozzle comprising a casing provided with an intake mouth and an intake passage leading therefrom, a movable support located in said mouth at one side of said intake passage and having picking fingers extending therefrom beyond the mouth and into the intake passage, stripping means for said picking fingers, said stripping means being secured to the casing and gradually extending outwardly therefrom in a direction longitudinally of the intake passage from a point adjacent the ends of the sides of the casing and within the outer limits of travel of the picker fingers to the middle portion of the nozzle beyond the outer limits of the travel of the fingers, whereby said stripping means acts to remove the burs from the fingers as the cotton is stripped therefrom and carried into said intake passage, and means located within the intake passage for stripping the cotton from said picking fingers.

4. A cotton picking device including in combination, a suction nozzle comprising a casing provided with an intake mouth and an intake passage leading therefrom, a movable support located in said mouth on two diametrically opposite sides of said intake passage and comprising fingers extending therefrom beyond the mouth and into said intake passage, stripping means secured to said casing and extending outwardly therefrom in a direction longitudinally of the intake passage from a point adjacent the ends at each side and within the outer limits of the travel of the picker fingers to the middle portion thereof beyond the outer limits of travel of the pickers, whereby the stripping means acts to remove the burs from said picking fingers as the cotton is stripped therefrom and carried into the intake passage, and means located within the intake passage for stripping the cotton from said picking fingers.

5. A cotton picking device having a suction nozzle comprising a casing provided with an intake mouth and passage leading therefrom, a movable support located in said mouth on two diametrically opposite sides of said intake passage, and having fingers extending beyond the mouth and into the passage, projecting means on each of the two remaining sides of the mouth, each gradually extending substantially in the planes thereof outwardly therefrom in a direction longitudinally of the intake passage, from a point adjacent the ends of the side and within the outer limits of the travel of the picker fingers to the middle portion thereof, beyond the outer limits of the travel of the fingers, whereby the projecting means act to remove the burs from the path of the fingers as the cotton is stripped therefrom and carried into the intake passage.

6. A cotton picking device having a suction nozzle comprising a casing provided with an intake mouth and passage leading therefrom, a movable support located in said mouth on two diametrically opposite sides of said intake passage, and having fingers extending therefrom beyond the mouth and into the passage, projecting means on each of the two remaining sides of the mouth, each gradually extending substantially in the planes thereof outwardly therefrom in a direction longitudinally of the intake passage, from a point adjacent the ends of the side and within the outer limits of the travel of the picker fingers to the middle portion thereof, beyond the outer limits of the travel of the fingers, whereby the projecting means act to remove the burs from the path of the fingers as the cotton is stripped therefrom and carried into the intake passage, and means located within said intake passage for stripping the cotton fiber from the picking fingers.

7. A cotton picker, including in combination a nozzle, having a central suction intake passage, a rotating carrier at each side of said central suction passage, picker fingers mounted on each carrier, stripping plates at each side of said nozzle, and extending in a plane substantially parallel with the plane of travel of said fingers, said stripping plates having their edges inclined outwardly toward the center of the nozzle and extending, longitudinally of the intake passage beyond the path of travel of said picking devices, in front of said intake passage, and at points adjacent the intake passage on the picking sides thereof, whereby the burs and twigs engaging said edges will be stripped from the picking fingers.

8. A cotton picker, including in combination a nozzle, having a central suction intake passage, a rotating carrier at each side of said central suction passage, picker fingers mounted on each carrier, stripping plates at each side of said nozzle, and extending in a plane substantially parallel with the plane of travel of said fingers, said stripping plates having their edges inclined outwardly toward the center of the nozzle and extending, longitudinally of the intake passage, beyond the path of travel of said picking devices, in front of said intake passage, and at points adjacent the intake passage on the picking sides thereof, whereby the burs and twigs engaging said edges will be stripped from the picking fingers, and means located within said intake passage for stripping the cotton from said picking fingers.

9. A cotton picker, including in combination a nozzle, having a central suction intake passage, a rotating carrier at each side of said central suction passage, picker fingers mounted on each carrier, stripping plates at each side of said nozzle, and extending in a plane substantially parallel with the plane of travel of said fingers, said stripping plates having their edges inclined outwardly toward the center of the nozzle and extending, longitudinally of the intake passage, beyond the path of travel of said picking devices, in front of said intake passage, and at points adjacent the intake passage on the picking sides thereof, whereby the burs and twigs engaging said edges will be stripped from the picking fingers, said plates centrally of the nozzle having lips carried thereby, forming shoulders.

10. A cotton picker, including in combination a nozzle, having a central intake passage, rotating picker fingers, located at one side of said intake passage, stripper plates located at each side of the nozzle and extending in the same general direction as a plane of rotation of said picker fingers, said plates having their edges inclined outwardly toward the center of the nozzle, said plates being bent inwardly over the intake passage, whereby the edges of said plates serve to strip the burs and twigs from the rotating picker fingers.

11. A cotton picker, including in combination a nozzle, having a central intake passage, rotating picker fingers, located on opposite sides of said intake passage, plates located at each side of the nozzle and extending in the same general direction as the plane of movement of said picker fingers, the edges of said plates being inclined outwardly toward the center of the nozzle and bent inwardly over said intake passage, whereby said nozzle is divided so as to provide two separate picking regions, located on opposite sides of said intake passage.

12. A cotton picker, including in combination a nozzle, having a central intake passage, rotating picker fingers, located on opposite sides of said intake passage, plates located at each side of the nozzle and extending in the same general direction as the plane of movement of said picker fingers, the edges of said plates being inclined outwardly toward the center of the nozzle and bent inwardly over said intake passage, whereby said nozzle is divided so as to provide two separate picking regions, located on opposite sides of said intake passage, and means located within said intake passage for stripping the cotton from said picker fingers.

13. A cotton picker, including in combination a nozzle, having a central intake passage, rotating picker fingers, located on opposite sides of said intake passage, plates located at each side of the nozzle and extending in the same general direction as the plane of movement of said picker fingers, the edges of said plates being inclined outwardly toward the center of the nozzle and bent inwardly over said intake passage, whereby said nozzle is divided so as to provide two separate picking regions, located on opposite sides of said intake passage, said plates directly in front of said intake passage having outwardly bent lips carried thereby, which lips form shoulders with the inclined edges of the plates.

14. A cotton picker including in combination a nozzle, a central suction intake passage, said nozzle having two picking faces inclined relative to each other, toward the center of the nozzle, rotating carriers located on opposite sides of said intake passage, picker fingers mounted on said carriers, and stripping plates located at each side of said nozzle and extending in the same general direction with the plane of movement of said picker fingers, said plates having their edges inclined outwardly toward the center of the nozzle, said plates being bent inwardly over the intake passage, whereby said nozzle is divided so as to provide two separate picking regions, one on each side of said intake passage.

15. A cotton picker including in combination a nozzle, a central suction intake passage, said nozzle having two picking faces inclined relative to each other, toward the center of the nozzle, rotating carriers located on opposite sides of said intake passage, picker fingers mounted on said carriers, stripping plates located at each side of said nozzle and extending in the same general direction as the plane of movement of said picker fingers, said plates having their edges inclined outwardly toward the center of the nozzle, said plates being bent inwardly over the intake passage, whereby said nozzle is divided so as to provide two separate picking regions, one on each side of said intake passage, and means located within said intake passage for stripping the cotton from the picker fingers.

16. A cotton picker including in combination, a suction nozzle having an intake mouth and an intake passage leading therefrom, movable supports located in said mouth on two diametrically opposite sides of said intake passage and having fingers extending beyond the mouth and into said intake passage, devices located on opposite sides of said intake passage, said devices being shaped so as to extend outwardly toward the center of the nozzle and inwardly over said intake passage, whereby said nozzle is divided into two separate picking regions located on opposite sides of said intake passage, said devices also serving to remove the burs from the picker fingers as the cotton is stripped therefrom and carried to said intake passage.

In testimony whereof I affix my signature, in presence of two witnesses.

THEODORE E. STRAUS.

Witnesses:
A. M. PARKINS,
C. L. STURTEVANT.